F. H. LEINWEBER, DEC'D.
C. H., W. H. AND V. H. LEINWEBER, EXECUTORS.
INTERNAL COMBUSTION ENGINE.
APPLICATION FILED OCT. 13, 1916. RENEWED JAN. 24, 1920.
1,344,641.
Patented June 29, 1920.
6 SHEETS—SHEET 1.
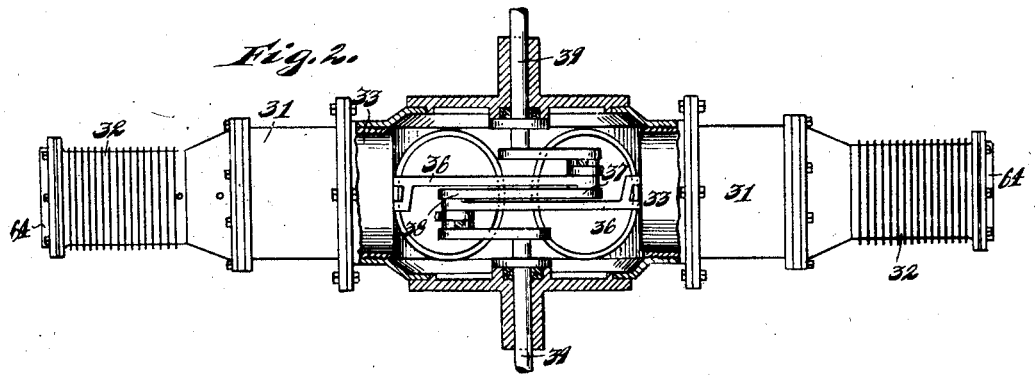
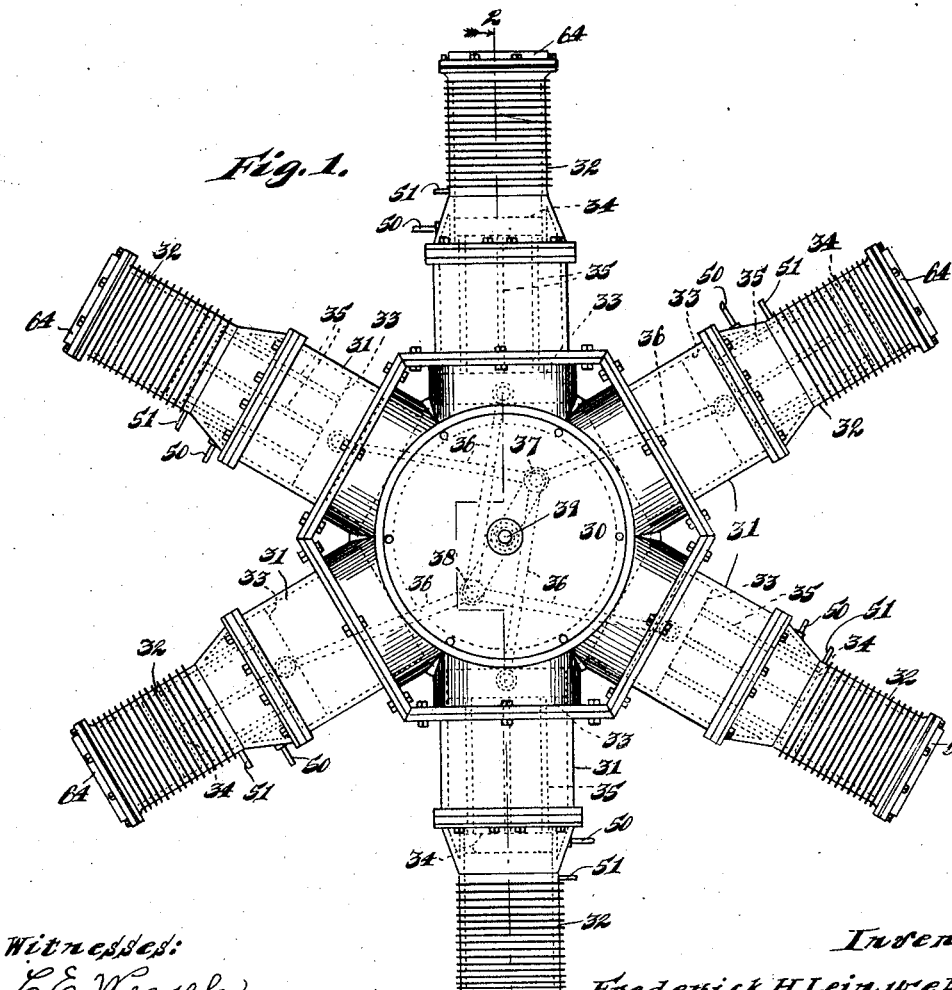

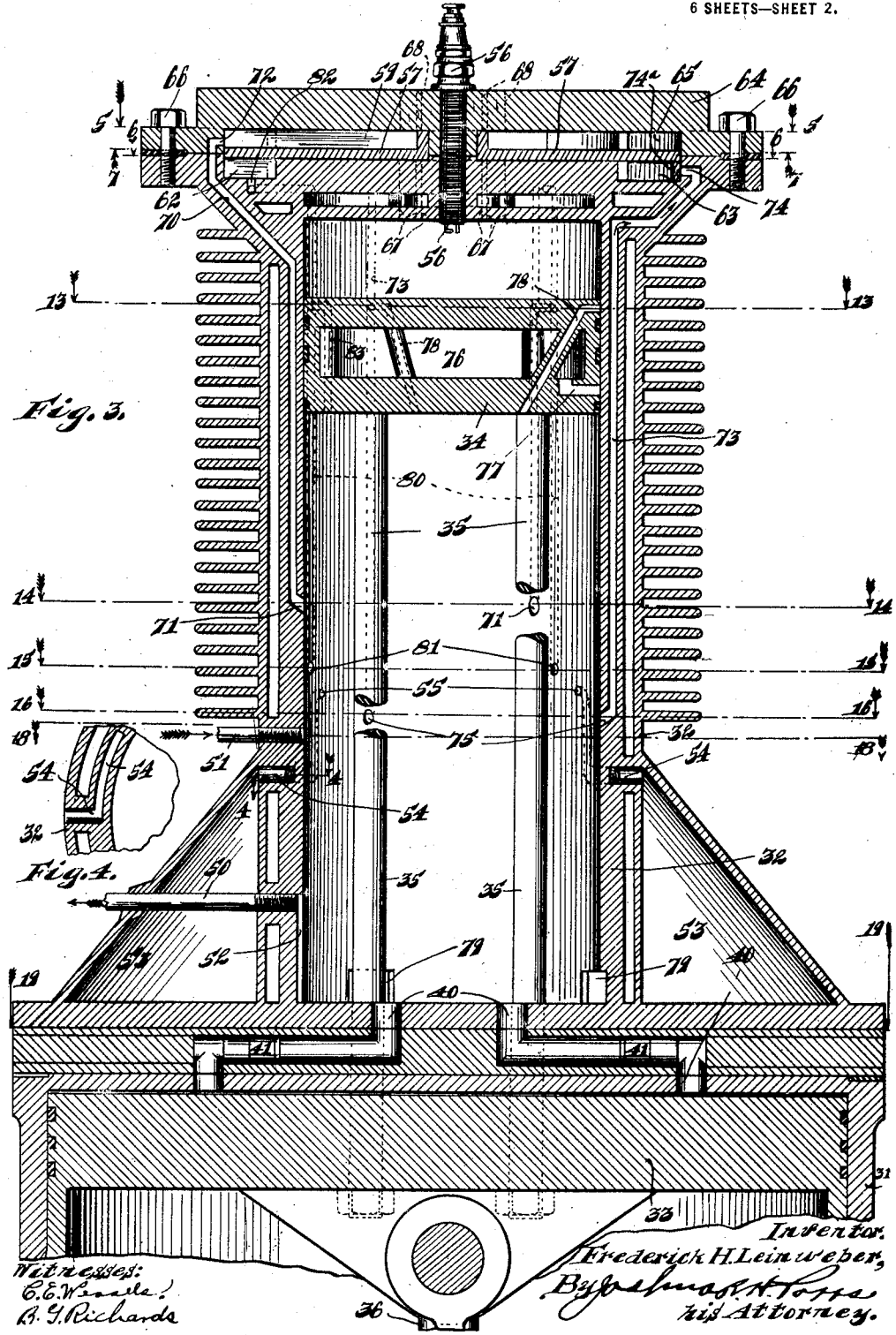

F. H. LEINWEBER, DEC'D.
C. H., W. H. AND V. H. LEINWEBER, EXECUTORS.
INTERNAL COMBUSTION ENGINE.
APPLICATION FILED OCT. 13, 1916. RENEWED JAN. 24, 1920.
1,344,641. Patented June 29, 1920.
6 SHEETS—SHEET 3.
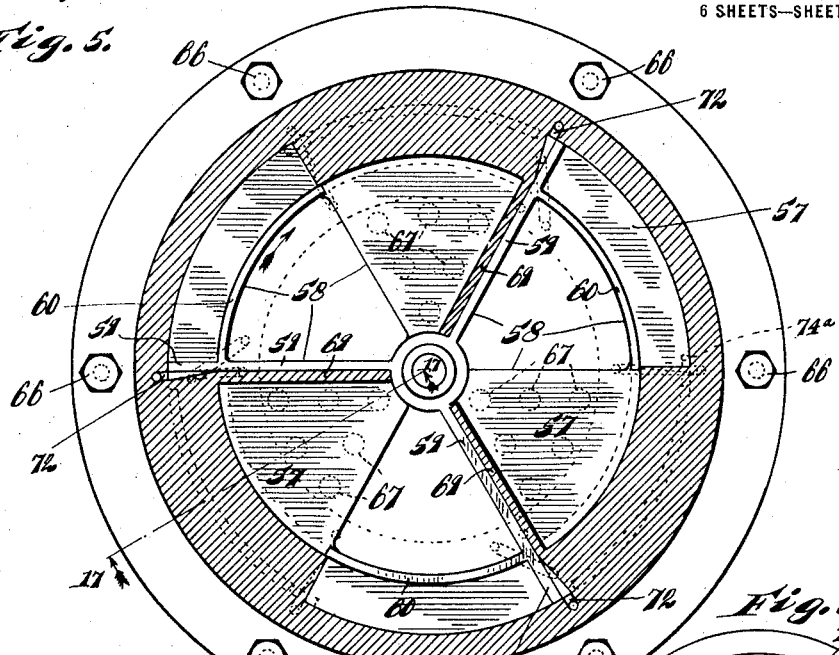
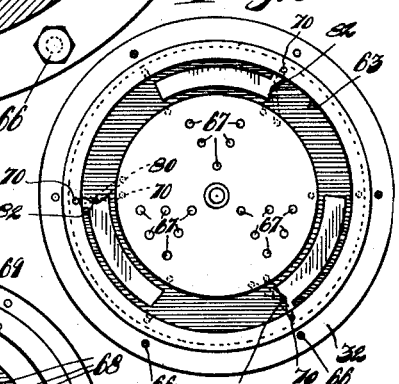
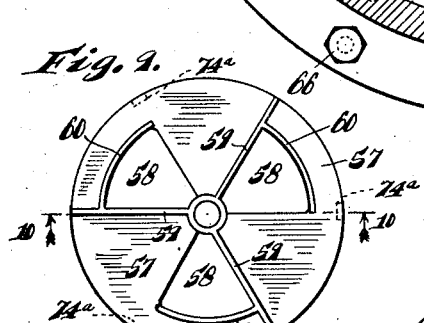
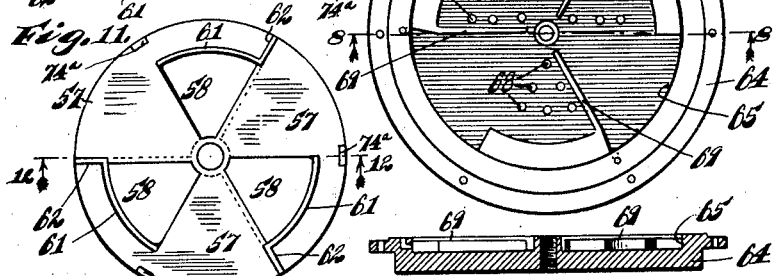
Inventor:
Frederick H. Leinweber,
By Joshua R. H. Potts
his Attorney.
Witnesses:
E. E. Wessels
B. G. Richards F. H. LEINWEBER, DEC'D.
C. H., W. H. AND V. H. LEINWEBER, EXECUTORS.
INTERNAL COMBUSTION ENGINE.
APPLICATION FILED OCT. 13, 1916. RENEWED JAN. 24, 1920.

1,344,641. Patented June 29, 1920.
6 SHEETS—SHEET 4.

Witnesses:
C. E. Wessels
B. J. Richards

Inventor:
Frederick H. Leinweber,
By Joshua R. H. Potts
his Attorney.

F. H. LEINWEBER, DEC'D.
C. H., W. H. AND V. H. LEINWEBER, EXECUTORS.
INTERNAL COMBUSTION ENGINE.
APPLICATION FILED OCT. 13, 1916. RENEWED JAN. 24, 1920.
1,344,641.
Patented June 29, 1920.
6 SHEETS—SHEET 5.
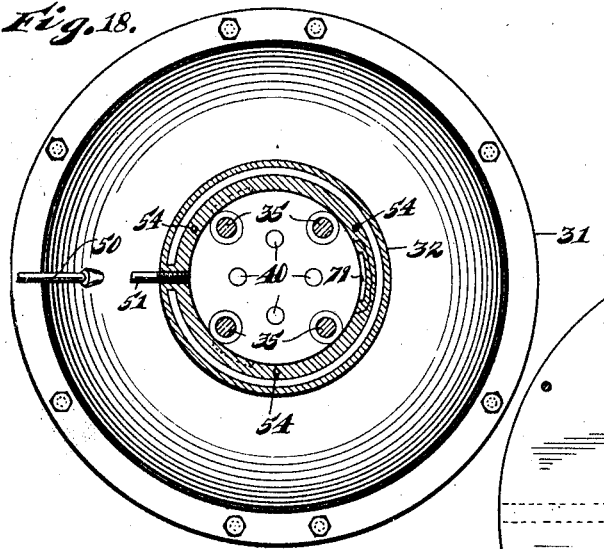
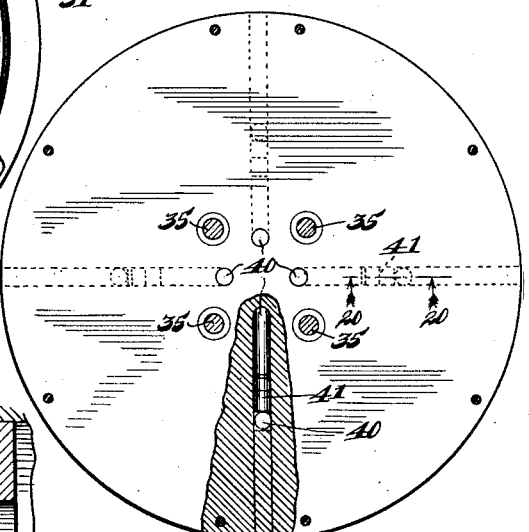
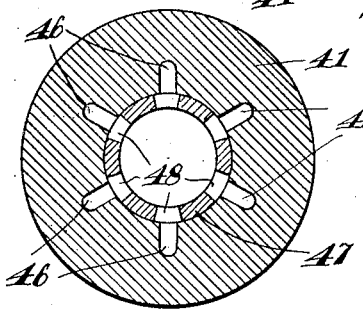
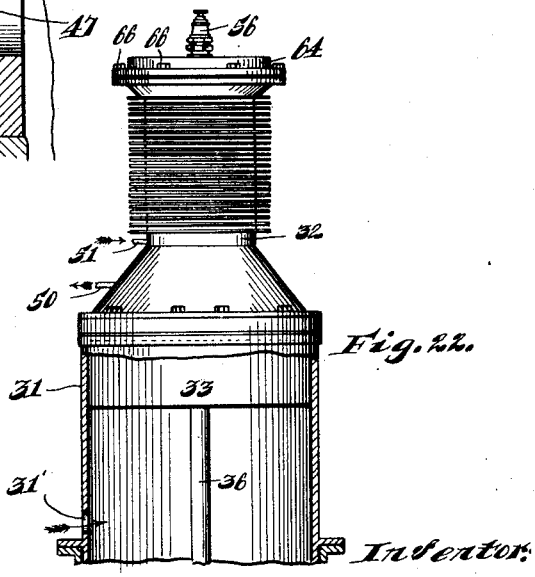

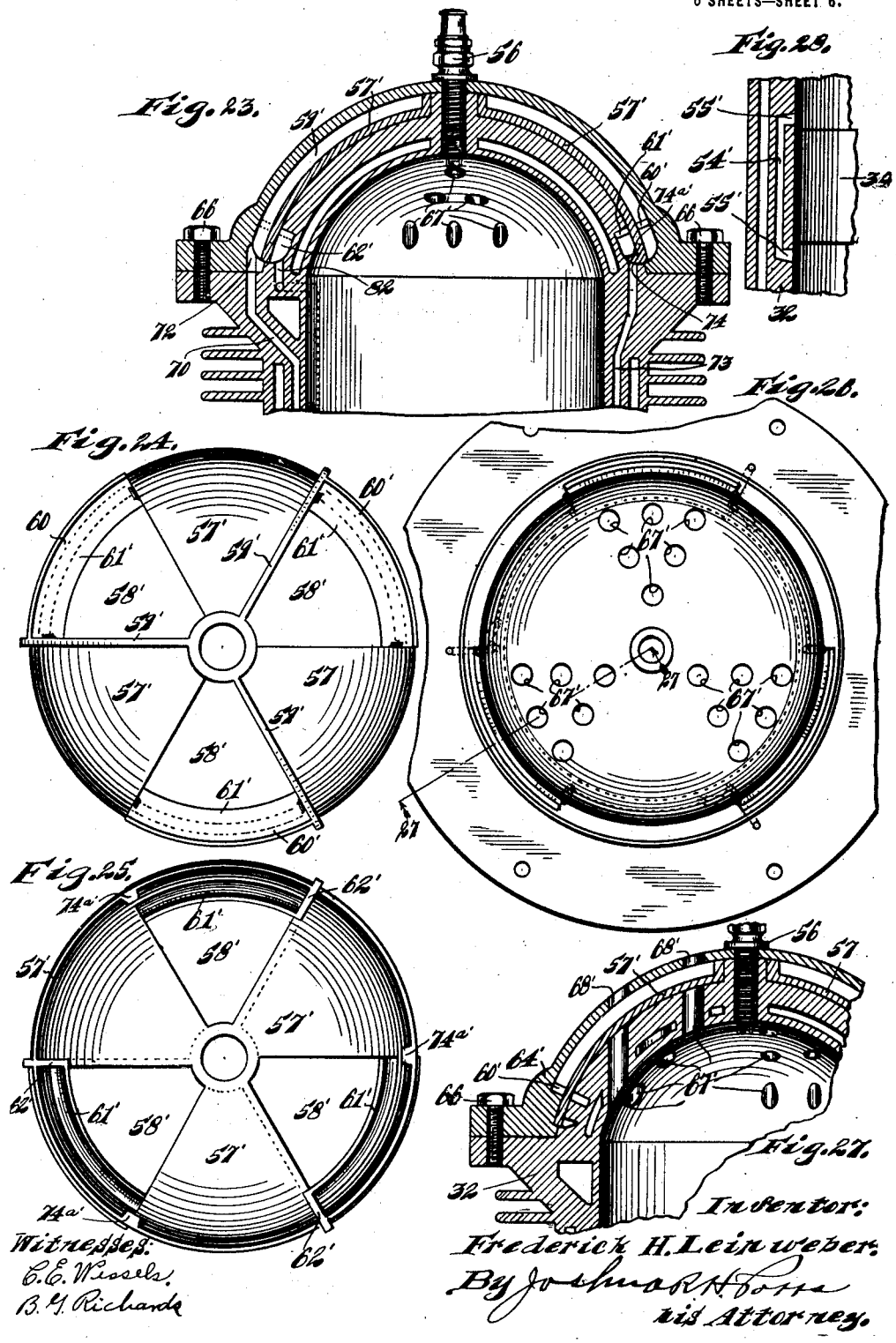

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER EXECUTORS OF SAID FREDERICK H. LEINWEBER, DECEASED.

INTERNAL-COMBUSTION ENGINE.

1,344,641.   Specification of Letters Patent.   Patented June 29, 1920.

Application filed October 13, 1916, Serial No. 125,491. Renewed January 24, 1920. Serial No. 353,813.

*To all whom it may concern:*

Be it known that I, FREDERICK H. LEINWEBER, a citizen of the United States, and a resident of the city of Chicago, county of Cook, and State of Illinois, have invented certain new and useful Improvements in Internal-Combustion Engines, of which the following is a specification.

My invention relates to improvements in internal combustion engines, and has for its object the provision of an improved construction of this character which is highly efficient in use.

Another object of the invention is to provide a construction of this character having a minimum of working parts.

A still further object of the invention is to provide a construction of this character having improved means for operating the valves of the engine.

Other objects will appear hereinafter.

With these objects in view, the invention consists in the combination and arrangements of parts hereinafter described and claimed.

Figures 13, 14:
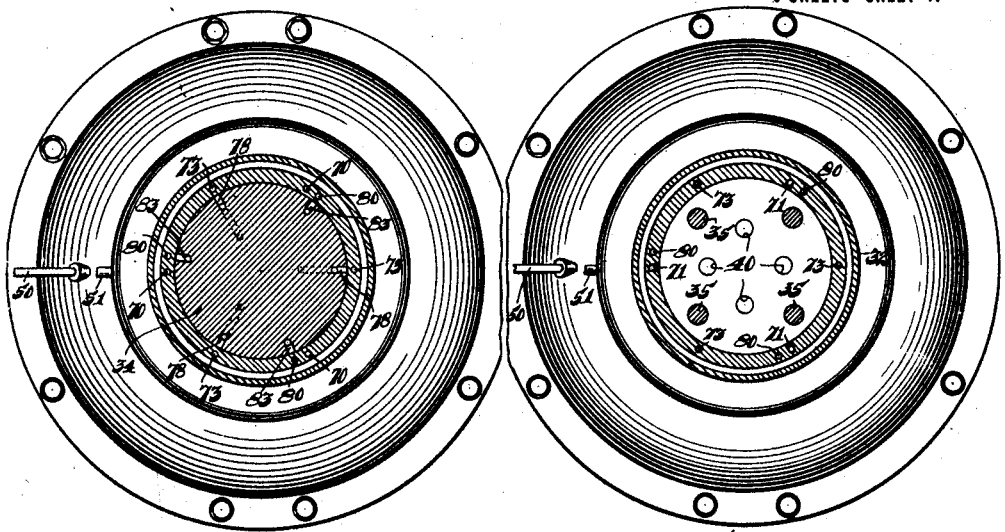
Figures 15, 16:
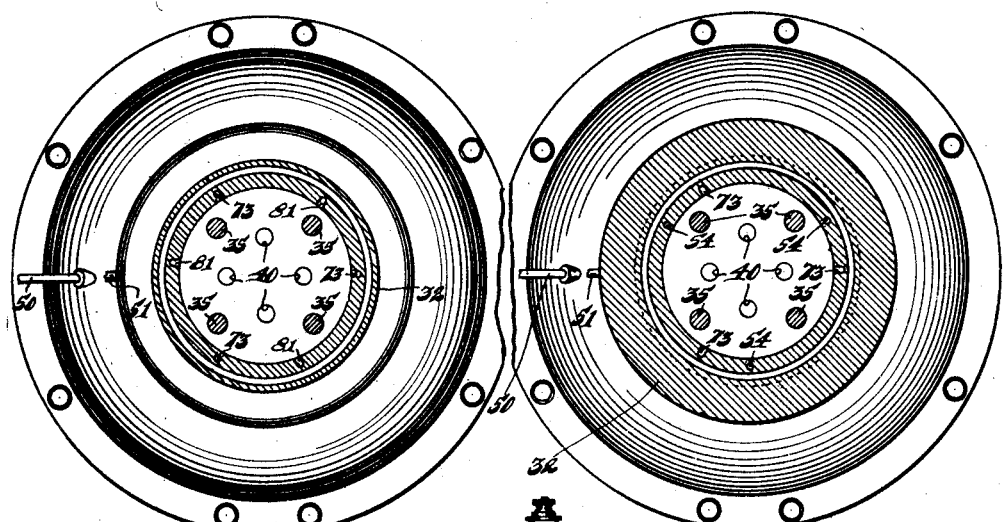
Figure 17:
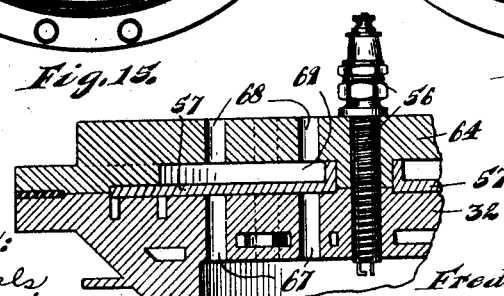

The invention will be best understood by reference to the accompanying drawings forming a part of this specification, and in which, Figure 1 is a side view of an engine embodying my invention, Fig. 2, a partial section of the same the sectional part thereof being taken substantially on line 2—2 of Fig. 1, Fig. 3, an enlarged longitudinal section taken through one of the cylinders of the engine, Fig. 4, an enlarged detail section taken on line 4—4 of Fig. 3, Fig. 5, a section taken on line 5—5 of Fig. 3, Fig. 6, a section taken on line 6—6 of Fig. 3 with the valve removed, Fig. 7, a section taken on line 7—7 of Fig. 3, Fig. 8, a section taken on line 8—8 of Fig. 7, Fig. 9, a top plan view of one of the valves employed in the engine, Fig. 10, a section taken on line 10—10 of Fig. 9, Fig. 11, a bottom plan view of the valve shown in Fig. 9, Fig. 12, a section taken on line 12—12 of Fig. 11, Fig. 13, a section taken on line 13—13 of Fig. 3, Fig. 14, a section taken on line 14—14 of Fig. 3, Fig. 15, a section taken on line 15—15 of Fig. 3, Fig. 16, a section taken on line 16—16 of Fig. 3, Fig. 17, a section taken on line 17—17 of Fig. 5, Fig. 18, a section taken on line 18—18 of Fig. 3, Fig. 19, a section taken on line 19—19 of Fig. 3, Fig. 20, an enlarged detail section of one of a plurality of check valves employed in the construction, Fig. 21, a section taken on line 21—21 of Fig. 20, Fig. 22, a partial longitudinal section through one of the cylinders of the engine on a reduced scale, Fig. 23, a section illustrating a modified form of valve for the engine cylinders, Fig. 24, a top plan view of said valve, Fig. 25, a bottom plan view of said valve, Fig. 26, an end view of one of the cylinders with the valve removed, Fig. 27, a section taken on line 27—27 of Fig. 26, and Fig. 28, an enlarged detail section illustrating a modified form of port arrangement for scavenging the combustion cylinders of the engine.

The preferred form of construction, as illustrated in the drawings, comprises a central crank case 30 having a plurality of cylinders radiating therefrom, each of said radiating cylinders comprising an inner larger cylinder portion 31 and an outer coaxial smaller cylinder portion 32, the said cylinders being arranged in pairs and the members of each pair being diametrically and oppositely arranged, as shown. Pistons 33 and 34 are arranged to operate in each set of cylinders 31 and 32 and are rigidly connected together by means of rods 35 operating through suitable stuffing boxes in the inner end of each outer cylinder portion, the inner end of each outer cylinder portion being closed, as shown. Each of the pistons 33 is connected by means of a connecting rod 36 with one of two cranks 37 or 38 of a central crank shaft 39 mounted in the crank case 30. The cranks 37 and 38 of the crank shaft 39 are diametrically arranged, as indicated and the pistons in the members of each pair of cylinders are connected with opposite cranks, as shown. The arrangement is such that the explosions take place in each pair of cylinders simultaneously so as to balance each other and thus reduce vibrations in the engine.

Two passages 40 lead from the outer end of each of the cylinder portions 31 into the inner end of the corresponding cylinder portion 32 and each of said passages is equipped with a check valve 41, as best shown in detail in Figs. 20 and 21. This check valve consists of a hollow valve head 42 operating in a central bore 43 extending through the valve casing 41. The valve head 42 is provided with a central peripheral flange 44 operating freely and loosely in a central enlargement 45 in the bore of the valve casing. Ports 46 lead from the enlargement 45 to the opposite ends of the bore 43 and packing rings 47 are mounted beyond each end of the valve head 42 upon legs or arms 48, as shown. A spring 49 normally holds the valve head 42 to its seat to prevent passage of air from the corresponding cylinder portion 31 into the corresponding cylinder portion 32. By this arrangement air compressed in each of the cylinder portions 31 is freely admitted to the corresponding cylinder portion 32 but back flow of said air is prevented. The air for compression is admitted to each of the cylinder portions 31 through an inlet port 31', as shown in Fig. 22.

Pipes 50 and 51 lead from the inner portion of each of the cylinder portions 32 to a carbureter of any suitable or desired form, not shown, and arranged to supply air passing outwardly through pipe 50 and inwardly through pipe 51 with fuel to form an explosive charge. A dead-air chamber 53 is arranged about the inner end of each of the cylinder portions 32 and a plurality of ports 54 lead from the outer ends of the air chambers 53 and communicate with the corresponding cylinder portion 32 through ports 55, as indicated. A slot 52 is formed in the inner wall of each of the cylinder portions 32 and leading to the corresponding pipe 50 so as to provide for a constant supply of air to said pipe 50 notwithstanding the presence or passage of the corresponding piston 34. An ordinary spark plug 56 is arranged centrally in the outer end of each of the cylinder portions 32 and is properly connected in the ignition system of the engine, (not shown) to produce igniting sparks at the proper times, as will be readily understood by those skilled in this art, the engine construction disclosed operating on the two-cycle principle.

A rotary exhaust valve 57 is arranged at the outer end of each of the cylinders 32, each of said exhaust valves consisting of a disk or plate 57 having sector shaped ports or openings 58 extending therethrough. A radial flange 59 is arranged on the plate 57 adjacent corresponding edges of the openings 58 and a segmental flange 60 is arranged adjacent the outer arcs of the openings 58, as best shown in Figs. 9 and 10. Likewise a segmental flange 61 is arranged on the bottom of the plate 57 adjacent the outer arc of the openings 58 and a flange 62 is positioned under the outer portion of each of the corresponding flanges 59. A suitable recess 63 is arranged in the outer end of each of the cylinders 32 to receive the corresponding valve 57 and the flanges thereof and an inclosing cap 64 is arranged over each of said valves and also provided with a recess 65 to receive the flanges on the upper or outer side of each of the disks 57. Each of the caps 64 is secured in place by means of suitable cap screws 66. Suitable sets of ports or openings 68 are arranged in each of the caps 64 to register with corresponding sets of openings 67 so as to provide free exhaust for the outer end of each of the cylinders 32 when the openings 58 are brought in registration with the openings 67—68. Suitable flanges 69 are arranged on the cap 64 to coöperate with the corresponding flanges on the outer sides of the corresponding valve plates 57 to form gas chambers, as shown. Passages 70 are arranged in the walls of each of the cylinders 32 leading from ports 71 communicating with said cylinders about midway of their lengths and communicating with the corresponding recess 65 through ports 72, as shown. Likewise passages 73 lead from ports 75 positioned somewhat inwardly with reference to the ports 71 and communicate with ports 74 leading into recess 63, the arrangement being such that, as the corresponding piston 34 moves under the impulse of the explosion in the corresponding cylinder 32, the ports 71 are first uncovered by said piston to admit combustion pressure to passages 70 and thence to recess 65, said pressure serving to rotate the corresponding valve 57 to open the ports 67—68 to effect exhaust of the corresponding cylinder 32. Each of the pistons 34 is made hollow and provided with an internal exhaust chamber 76 having a plurality of ports 77 leading from the lower end thereof in position to register with ports 75. Likewise passages 78 are extended from adjacent the upper edges of each of the pistons 34 through said piston and in position to register with the ports 75. By-pass passages 79 are formed in the interior walls of each of the cylinders 32 to register with the corresponding ports 77. The arrangement is such that shortly after the exhaust valve has opened, as explained above, the ports 77 come in registration with the ports 75 and permit exhaust of the passages 73 and recess 63, to permit of the ready opening of the corresponding valve 57. Shortly thereafter, the upper ends of the passages 78 come into registration with the ports 75 permitting air, under pressure from the inner end of the corresponding cylinder 32, to pass into the passages 73 and thus serve to close the valve 57, as will be readily understood. Valve 57 carries a lip or shoulder 74$^a$ arranged to close port 74 at the end of the closing movement of valve 57 so that the imprisoned air will serve as a lock to hold said valve closed during compression and explosion. Shortly prior to the closing of the valve 57, as explained, the ports 55 are uncovered to permit of the escape of a certain amount of compressed air in the corresponding chamber 53 to scavenge the corresponding cylinder 32. Shortly after the opening of the ports 55, the inner end of pipe 51 is opened, thus permitting passage of compressed air outwardly through pipe 50 through the carbureter and inwardly through pipe 51 to recharge the corresponding cylinder 32. Continued inward movement of the corresponding piston 34 serves to continue the passage of air through the carbureter and the further charging of the combustion cylinder. At the end of the stroke of each of the pistons 34, the ports 77 come in registration with the by-pass ports 79 to permit of exhaust of the corresponding exhaust chamber 76, as will be readily understood. Then the piston 34 performs its return stroke compressing the admitted charge in the outer end of cylinder 32 which is fired in the usual manner to cause continuous operation of each of the cylinders 32, and said cylinders are arranged, as explained above, to fire in pairs to cause continuous operation of crank shaft 39 without material vibration of the engine.

The arrangement set forth is a simple and efficient one for the purpose of having few parts and capable of operating without material vibration. It will be observed that the combustion pressure employed for opening the exhaust valve is introduced on top of said valve so as to counteract and balance the normal pressure in the cylinder which is exerted against the inner side of said valve.

To provide for the contingency when a charge fails to explode in any one of the cylinders 32, a plurality of auxiliary air passages 80 are provided in the walls of each of the cylinders 32 leading from ports 81 in said walls to the corresponding recess 63, as indicated, communicating with said recess through the ports 82, as shown, and passages 83 are provided in piston 34 to register with ports 81. In case a charge should fail to ignite, upon the next operation of the piston, the pressure in the combustion end of the corresponding cylinder will be greatly increased, owing to the failure to exhaust, and this increase of pressure admitted through the ports 71 to the recess 65. Shortly thereafter passages 83 will open ports 81 to the pressure below the piston and coöperating with the pressure admitted through the ports 71 to the recess 65 will serve to open the valve to permit of exhaust, the further operation of the engine continuing normal, but upon any occasion of two successive failures of the explosive charge to ignite, the corresponding cylinder will be automatically exhausted, as explained.

In the modified form of construction illustrated in Figs. 23 to 27 inclusive, a substantially hemispherical valve 57' has been substituted for the flat valve 57 heretofore described. Otherwise the construction is identical with that already described. In the drawings the parts corresponding to the valve 57, and parts 58, 59, 60 and so forth, have been marked 57', 58', 59', 60', and so forth to indicate the correspondence in form and function between the various parts. The operation is identical with that already described and needs no further description here.

The modified form of construction illustrated in Fig. 28 sets forth a slightly different means for scavenging the outer ends of the cylinders 32. In this arrangement a by-pass is formed in the walls of each of the cylinders 32 comprising a passage 54' communicating with ports 55', said ports being positioned a little farther apart than the length of the piston 34, so that as the piston 34 descends a limited amount of air will be permitted to pass around said piston to scavenge the outer portion of the cylinder just prior to the admission of the explosive charge.

In the arrangement set forth six explosions will take place during each revolution of the crank shaft, so that the power strokes of the engine overlap each other, and each cylinder has an independent carbureter, thereby insuring positive and uniform charging of the cylinders, absolutely equal power strokes and absence of all vibration. The effect of the rotary or oscillating valve, and coöperating parts, is to provide a direct exhaust and a double filling of the combustion cylinders with air, thus insuring internal air cooling of the cylinders, complete and rapid exhaust and elimination of danger of overheating. The many small exhaust ports employed cause a noiseless exhaust.

While I have illustrated and described the preferred forms of construction for carrying my invention into effect, these are capable of variation and modification without departing from the spirit of the invention. I, therefore, do not wish to be limited to the precise details of constructions set forth, but desire to avail myself of such variations and modifications as come within the scope of the appended claims.

Having described my invention what I claim as new and desire to secure by Letters Patent is:

1. An internal combustion engine comprising a combustion cylinder closed at both ends; a piston operating in said cylinder under combustion in one end and to compress air in the other end; an exhaust valve for the combustion end; and means for utilizing the combustion and compressed air pressures for opening and closing said valve, substantially as described.

2. An internal combustion engine comprising a combustion cylinder closed at both ends; a piston operating in said cylinder under combustion at one end and to compress air in the other end; an exhaust valve for the combustion end; means for utilizing the combustion pressure for opening said valve; and means for utilizing said compressed air for closing said valve, substantially as described.

3. An internal combustion engine comprising a combustion cylinder closed at both ends; a piston operating in said cylinder under combustion at one end and to compress air in the other end; an exhaust valve for the combustion end; and a piston controlled port and passage for utilizing the combustion and compressed air pressure for opening and closing said valve, substantially as described.

4. An internal combustion engine comprising a combustion cylinder closed at both ends; a piston operating in said cylinder under combustion at one end and to compress air at the other end; an exhaust valve for the combustion end; and a piston controlled port and passage for utilizing the combustion for opening said valve; and a piston controlled port and passage for utilizing the compressed air for closing said valve, substantially as described.

5. An internal combustion engine comprising a combustion cylinder closed at both ends; a piston operating in said cylinder under combustion at one end and to compress air at the other end; piston controlled parts and passages for utilizing the combustion for operating said valve; piston controlled ports and passages for utilizing the compressed air for closing said valve; and a supplemental port and passage operable by said pressure and arranged to assist in opening said exhaust valve in case of failure of the charge to ignite, substantially as described.

6. An internal combustion engine comprising a combustion cylinder; a pressure operable exhaust valve for said cylinder; passage and ports in the walls of said cylinder for operating said valve; a hollow piston in said cylinder having a port leading thereinto arranged to exhaust the valve operating passages; and means for exhausting said piston, substantially as described.

7. An internal combustion engine comprising a combustion cylinder; a pressure operable exhaust valve for said cylinder; passages and ports in the walls of said cylinder for operating said valve; a hollow piston in said cylinder having a port leading thereinto arranged to exhaust the valve operating passages; and a by-pass in the walls of said cylinder for exhausting said piston, substantially as described.

8. An internal combustion engine comprising a combustion cylinder closed at both ends; a piston operating in said cylinder under combustion at one end and to compress air in the other end; an exhaust valve for the combustion end; means for utilizing the combustion and compressed air pressures for opening and closing said valve, a dead air chamber surrounding the air compressing end of said cylinder; and a passage and port leading from said chamber into said cylinder and operable by said piston to admit air from said chamber shortly after the exhaust, substantially as described.

9. An internal combustion engine comprising a combustion cylinder closed at both ends; a piston operating in said cylinder under the combustion at one end and to compress air in the other end; an exhaust valve for the combustion end; means for utilizing the combustion pressure for opening said valve; means for utilizing said compressed air for closing said valve; a dead air chamber surrounding the air compressing end of said cylinder; and a passage and port leading from said chamber into said cylinder and operable by said pressure to admit air from said chamber, substantially as described.

10. An internal combustion engine comprising a cylinder having both ends closed; a piston reciprocating in said cylinder; means of ignition for one end of said cylinder; means for introducing pure air into the other end of said cylinder; a carbureter; means for forcing air under pressure from said other end of said cylinder through said carbureter into said first mentioned end; an exhaust valve for the combustion end of said cylinder; means for utilizing combustion pressure in said cylinder end for opening said valve; and pressure operable means for closing said valve, substantially as described.

11. An internal combustion engine comprising a combustion cylinder closed at both ends; an exhaust valve for the outer end of said cylinder; means for forcing air under pressure into the inner end of said cylinder; means for utilizing combustion pressure in the outer end of said cylinder for opening said valve; means for utilizing air in the inner end of said cylinder for promoting combustion in the outer end thereof; and means for utilizing pressure in the inner end of said combustion cylinder for closing said valve, substantially as described.

12. An internal combustion engine comprising a combustion cylinder closed at both ends; an exhaust valve for the outer end of said cylinder; means for forcing air under pressure into the inner end of said cylinder; means for utilizing combustion pressure in the outer end of said cylinder for opening said valve; means for utilizing air in the inner end of said cylinder for scavenging and charging the outer end thereof; and means for utilizing pressure in the inner end of said combustion cylinder for closing said valve, substantially as described.

13. An internal combustion engine comprising a combustion cylinder closed at both ends; an exhaust valve for the outer end of said cylinder; an air cylinder coaxial with said combustion cylinder and in communication with the inner end thereof; a check valve in said communication; rigidly connected pistons in said cylinders; means for utilizing air in the inner end of said combustion cylinder for promoting combustion in the outer end thereof; means for utilizing combustion pressure in the outer end of said cylinder for opening said valve; and means for utilizing pressure in the inner end of said combustion cylinder for closing said valve, substantially as described.

14. An internal combustion engine comprising a combustion cylinder closed at both ends; an exhaust valve for the outer end of said cylinder; an air cylinder coaxial with said combustion cylinder and in communication with the inner end thereof; a check valve in said communication; rigidly connected pistons in said cylinders; means for utilizing air in the inner end of said combustion cylinder for scavenging and charging the outer end thereof; means for utilizing combustion pressure in the outer end of said cylinder for opening said valve; and means for utilizing pressure in the inner end of said combustion cylinder for closing said valve, substantially as described.

15. An internal combustion engine comprising a combustion cylinder closed at both ends; a rotary exhaust valve at the outer end of said cylinder having sector openings therein, there being openings extending through the head of the cylinder arranged to register with said sector openings; an air cylinder coaxial with said combustion cylinder and in communication with the inner end thereof; a check valve in said communication; rigidly connected pistons in said cylinders; a carbureter; piston controlled ports in the walls of said cylinder and arranged to direct air under pressure from the end of said cylinder through said carbureter into the outer end of the cylinder; piston controlled ports arranged to inject air into the outer end of said cylinder for scavenging the same; a piston controlled port arranged to supply combustion pressure from the outer end of said cylinder to said rotary valve for opening the same; and a piston controlled port arranged to supply air under pressure from the inner end of said cylinder to said valve for closing the same, substantially as described.

16. An internal combustion engine comprising a combustion cylinder closed at both ends; a rotary exhaust valve at the outer end of said cylinder having sector openings therein, there being openings extending through the head of the cylinder arranged to register with said sector openings; an air cylinder coaxial with said combustion cylinder and in communication with the inner end thereof; a check valve in said communication; rigidly connected pistons in said cylinders; a carbureter; piston controlled ports in the walls of said cylinder and arranged to direct air under pressure from the end of said cylinder through said carbureter into the outer end of the cylinder; piston controlled ports arranged to inject air into the outer end of said cylinder for scavenging the same; a piston controlled port arranged to supply combustion pressure from the outer end of said cylinder to said rotary valve for opening the same; a piston controlled port arranged to supply air under pressure from the inner end of said cylinder to said valve for closing the same; and a piston controlled auxiliary port arranged to supply pressure from the outer end of said cylinder to said rotary valve to open the same, said auxiliary port being positioned at a point in the wall of said cylinder nearer the end of the working stroke of the piston than the first mentioned port for opening said valve, substantially as described.

17. In an internal combustion engine, a combustion cylinder closed at both ends, a piston operating in said cylinder under combustion in one end and to compress air in the other end, an exhaust valve for the combustion end, means for opening said valve to permit exhaust, and means for utilizing said compressed air for closing said valve substantially as set forth.

18. In an internal combustion engine, a combustion cylinder closed at both ends, a piston operating in said cylinder under combustion in one end and to compress air in the other end, a rotary exhaust valve for the combustion end, said valve having a flange thereon, means of ignition in said cylinder, and means for utilizing combustion pressure in said cylinder against said flange to open said exhaust valve.

19. In an internal combustion engine, a combustion cylinder closed at both ends, a piston operating in said cylinder under combustion in one end and to compress air in the other end, a rotary exhaust valve for the combustion end, said valve having a flange thereon, means of ignition in said cylinder, means for utilizing combustion pressure in said cylinder against said flange to open said exhaust valve, a further flange on said rotary valve, and means for utilizing the compressed air pressure against said further flange to close said valve.

In testimony whereof I have signed my name to this specification in the presence of two subscribing witnesses.

FREDERICK H. LEINWEBER.

Witnesses:
   JOSHUA R. H. POTTS,
   HELEN F. LILLIS.